C. N. Dunham.
Spectacles.
N° 82,930.  Patented Oct. 13, 1868.
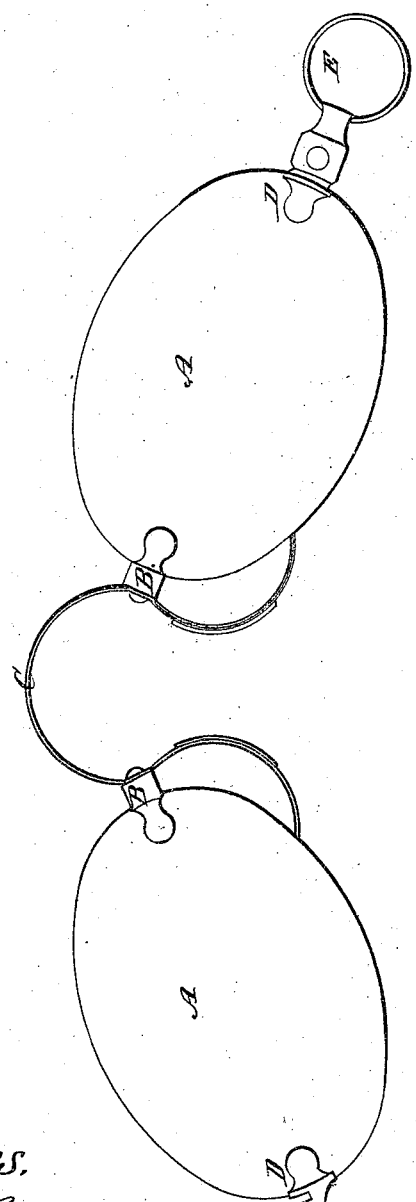
Witnesses.
Samuel Henshall
John Weir.
Inventor.
Charles N. Dunham
pr Francis D. Pastorius.
Attorney

CHARLES N. DUNHAM, OF PHILADELPHIA, PENNSYLVANIA.

Letters Patent No. 82,930, dated October 13, 1868.

IMPROVEMENT IN MOUNTING SPECTACLE AND EYE-GLASSES.

The Schedule referred to in these Letters Patent and making part of the same.

*To all whom it may concern:*

Be it known that I, CHARLES N. DUNHAM, of the city of Philadelphia, and State of Pennsylvania, have invented a new and useful Improvement in Spectacles, Eye-Glasses, &c.; and I do hereby declare that the following is a full, clear, and exact description of the same, reference being had to the accompanying drawing, and to the letters of reference marked thereon, making part of this specification.

My invention consists in cementing the pieces B B, to which the nose-spring C is fixed, and the pieces D D, which serve either for holding the glasses together, when they are doubled or closed one over the other, to the glasses A, of either eye-glasses or spectacles. In the case of spectacles, the pieces D D can be jaws for holding the arms.

I am aware that both eye-glasses and spectacles have heretofore been made without frames, pieces, similar to the pieces B B and D D, being riveted to the glasses in lieu thereof. My invention consists in cementing the said pieces to the glasses, by which very great advantages are derived, both in the manufacture and use of both eye-glasses and spectacles. When the said pieces are riveted on, the glasses require to have suitable rivet-holes previously drilled in them, which drilling, in a majority of instances, cracks the glasses. When the pieces are riveted to the glasses with a single rivet for each piece, the contact soon becomes loosened. To employ two rivets, doubles the chances of fracturing the glasses in drilling. The rivets, to properly fix the pieces to the glasses, must snugly and neatly fit the holes drilled in the glass. The consequence is, when they get heated, as they will, when confined a long time about the person, or by chance are exposed to the heat of the sun, they expand and split the glasses. The pieces B B and D D, when cemented to the glasses, cannot be removed without destroying them by cracking or laminating. It is usual to open eye-glasses by springing, which invariably splits the glasses when rivets are used, but not when cemented.

What I claim as my invention, and desire to secure by Letters Patent, is—

The glasses A A, having the pieces B B, D D cemented to them, as a new article of manufacture.

In testimony whereof, I hereunto sign my name to this specification in presence of two subscribing witnesses.

CHAS. N. DUNHAM.

Witnesses:
W. W. DOUGHERTY,
FRANCIS D. PASTORIUS.